(12) United States Patent
Ferree et al.

(10) Patent No.: US 11,136,654 B2
(45) Date of Patent: Oct. 5, 2021

(54) LOW-MANGANESE GAS-SHIELDED FLUX CORED WELDING ELECTRODES

(71) Applicant: The ESAB Group, Inc., Florence, SC (US)

(72) Inventors: Stanley E. Ferree, Hanover, PA (US); Frank B. Lake, McSherrystown, PA (US)

(73) Assignee: THE ESAB GROUP INC., Florence, SC (US)

( * ) Notice: Subject to any disclaimer, the term of this patent is extended or adjusted under 35 U.S.C. 154(b) by 277 days.

(21) Appl. No.: 16/400,420

(22) Filed: May 1, 2019

(65) Prior Publication Data

US 2020/0024705 A1    Jan. 23, 2020

Related U.S. Application Data

(63) Continuation of application No. 13/647,810, filed on Oct. 9, 2012, now Pat. No. 10,316,395.

(51) Int. Cl.
*B23K 35/30* (2006.01)
*C22C 38/00* (2006.01)
(Continued)

(52) U.S. Cl.
CPC ........ *C22C 38/001* (2013.01); *B23K 35/3026* (2013.01); *B23K 35/3093* (2013.01);
(Continued)

(58) Field of Classification Search
CPC ............ B23K 35/3026; B23K 35/3093; B23K 35/3602; B23K 35/362; C22C 38/001; C22C 38/02; C22C 38/04; C22C 38/14
See application file for complete search history.

(56) References Cited

U.S. PATENT DOCUMENTS 1,352,534 A    9/1920    Russell
2,354,147 A    7/1944    Scott
(Continued)

FOREIGN PATENT DOCUMENTS

CN    1368419 A    9/2002
CN    1840728 A    10/2006
(Continued)

OTHER PUBLICATIONS

Written Opinion for Brazil Patent Application No. BR112015007762-5 with English translation, dated Apr. 10, 2019, 10 pages.
(Continued)

*Primary Examiner* — Brian W Jennison
(74) *Attorney, Agent, or Firm* — Edell, Shapiro & Finnan, LLC

(57) ABSTRACT

A gas-shielded flux cored welding electrode comprises a ferrous metal sheath and a core within the sheath enclosing core ingredients. The core ingredients and sheath together comprise, in weight percentages based on the total weight of the core ingredients and the sheath: 0.25 to 1.50 manganese; 0.02 to 0.12 carbon; 0.003 to 0.02 boron; 0.2 to 1.5 silicon; 0 to 0.3 molybdenum; at least one of titanium, magnesium, and aluminum, wherein the total content of titanium, magnesium, and aluminum is 0.2 to 2.5; 3 to 12 titanium dioxide; at least one arc stabilizer, where the total content of arc stabilizers is 0.05 to 1.0; no greater than 10 of additional flux system components; remainder iron and incidental impurities.

15 Claims, 3 Drawing Sheets

(51) Int. Cl.
  *B23K 35/36*    (2006.01)
  *B23K 35/362*   (2006.01)
  *C22C 38/02*    (2006.01)
  *C22C 38/04*    (2006.01)
  *C22C 38/14*    (2006.01)

(52) U.S. Cl.
  CPC ........ *B23K 35/3602* (2013.01); *B23K 35/362* (2013.01); *C22C 38/02* (2013.01); *C22C 38/04* (2013.01); *C22C 38/14* (2013.01)

(56) References Cited

U.S. PATENT DOCUMENTS

| | | | |
|---|---|---|---|
| 4,426,426 | A | 1/1984 | Muhlberger |
| 4,517,441 | A | 5/1985 | Kaljee et al. |
| 5,233,160 | A | 8/1993 | Gordish |
| 5,857,141 | A | 1/1999 | Keegan et al. |
| 6,606,284 | B1 | 8/2003 | Sakamoto |
| 6,784,401 | B2 | 8/2004 | North |
| 7,091,448 | B2 | 8/2006 | North et al. |
| 9,029,733 | B2 | 5/2015 | Barhorst et al. |
| 9,815,148 | B2 | 11/2017 | Postle |
| 9,844,838 | B2 | 12/2017 | Barhorst et al. |
| 9,895,774 | B2 | 2/2018 | Barhorst et al. |
| 2002/0153364 | A1 | 10/2002 | North et al. |
| 2004/0020912 | A1 | 2/2004 | Noriyuki et al. |
| 2006/0081579 | A1 | 4/2006 | Kotecki |
| 2007/0181549 | A1 | 8/2007 | Hartman et al. |
| 2011/0114606 | A1 | 5/2011 | Suzuki |
| 2013/0313240 | A1 | 11/2013 | Amata et al. |
| 2014/0083981 | A1 | 3/2014 | Amata et al. |
| 2015/0239072 | A1 | 8/2015 | Barhorst et al. |
| 2016/0236302 | A1 | 8/2016 | Ogborn et al. |
| 2016/0311047 | A1 | 10/2016 | Schaeffer |
| 2017/0165793 | A1 | 6/2017 | Barhorst et al. |

FOREIGN PATENT DOCUMENTS

| | | |
|---|---|---|
| EP | 1769882 A1 | 4/2007 |
| EP | 1547722 B1 | 6/2010 |
| EP | 2289661 A1 | 3/2011 |
| EP | 2374571 A1 | 10/2011 |
| JP | S61286089 A | 12/1986 |
| JP | S62033094 A | 2/1987 |
| JP | S63273594 A | 11/1988 |
| JP | H07-328795 A | 12/1995 |
| JP | H08-281478 A | 10/1996 |
| JP | 2002301592 A | 10/2002 |
| JP | 2008087043 A | 4/2008 |
| JP | 2009248137 A | 10/2009 |
| JP | 2011189349 A | 9/2011 |
| JP | 2012121051 A | 6/2012 |
| RU | 2067042 C1 | 9/1996 |
| UA | 864 A | 4/1993 |
| WO | 2013177480 A1 | 11/2013 |

OTHER PUBLICATIONS

Communication Pursuant to Article 94(3) EPC for European Application No. 13 844 720.6 dated Jun. 4, 2020, 7 pages.
Office Action of substantive examination including translation for RU Patent Application No. 2015112988/02(020328) dated Dec. 6, 2016.
KIPO Notice of Final Rejection including translation for Korean Patent Application No. 10-2015-7008748, dated Nov. 10, 2016.
KIPO Notice of Preliminary Rejection including translation for Korean Patent Application No. 10-2015-7008748, dated Jun. 17, 2016.
Decision of Refusal including translation for Japanese Patent Application No. 2015-536816, dated Dec. 6, 2016.
Notification of Reasons for Refusal including translation for Japanese Patent Application No. 2015-536816, dated May 31, 2016.
Extended European Search Report for EP 13844720.6, dated Jun. 10, 2016.
Examiner Requisition for Canadian Patent Application No. 2,886,428, dated Sep. 12, 2016.
Examiner Requisition for Canadian Patent Application No. 2,886,428, dated Mar. 21, 2016.
Rejection Decision for Chinese Patent Application 201380052423.1 including translation dated May 24, 2018.
Notification of the Fourth Office Action for Chinese Patent Application 201380052423.1 including translation dated Dec. 1, 2017.
Notification of the Third Office Action for Chinese Patent Application 201380052423.1 including translation dated Jun. 15, 2017.
Communication from the European Patent Office for EP Application No. 13 844 720.6-1103 dated Mar. 14, 2019, 8 pages.
International Search Report and Written Opinion dated Aug. 12, 2014 for PCT Application PCT/US2013/063387, filed Oct. 4, 2013.
Fiore, S., "Hi-C Low Manganese FCAW Electrodes," Hobart Tubular Wire Division, ITW, 8 pgs. International Institute of Welding (IIW) Conference, Denver, CO>, Jul. 8-13, 2012.

LOW-MANGANESE GAS-SHIELDED FLUX CORED WELDING ELECTRODES

FIELD OF THE DISCLOSURE

The disclosure relates generally to gas-shielded flux cored arc welding electrodes, and more particularly to gas-shielded flux cored arc welding electrodes having low manganese content.

BACKGROUND OF THE DISCLOSURE

The American Welding Society specifications AWS A5.20/A5.20M and AWS A5.36/A5.36M, and other similar global specifications, govern the technical requirements for flux cored electrodes designed for welding carbon steels. For gas-shielded flux cored carbon steel electrodes classified as E7XT-1C, E7XT-1M, E7XT-9C, E7XT-9M, E7XT-12C, and E7XT-12M and containing titanium dioxide ($TiO_2$) based slag systems, AWS A5.20/A5.20M and AWS A5.36/A5.36M require the alloy content in the weld metal to be no greater than 1.75% manganese (1.60% for E7XT-12 type), 0.12% carbon, 0.90% silicon, 0.20% chromium, 0.50% nickel, 0.30% molybdenum, 0.08% vanadium, and 0.35% copper Although nickel is beneficial to weld metal toughness and ductility properties, the maximum allowed nickel level in these electrode types is fairly restrictive. Therefore, carbon, manganese, molybdenum, and silicon levels typically are adjusted to optimize weld metal properties.

In general, conventional gas-shielded flux cored welding electrodes with titanium dioxide based slag systems include significant levels of manganese and also may include small concentrations of boron to achieve desired weld metal toughness, tensile, and ductility properties. A drawback of conventional gas-shielded flux cored electrodes including titanium dioxide based slag systems is that the significant manganese levels that these electrodes contain may not meet certain emissions control regulations. For example, Metal Fabrication Hazardous Air Pollutants (MFHAP) requirements under U.S. Environmental Protection Agency regulations at 40 CFR Part 63 Subpart XXXXXX, which recently became effective, limit the manganese content of certain welding electrodes to less than 1.0 weight percent, based on total electrode weight.

The objectives of the present disclosure are to provide a gas-shielded flux cored electrode with a titanium dioxide based slag system that contains relatively low manganese content and produces welding fumes containing relatively low manganese levels, but produces weld deposits having mechanical properties that meet certain applicable requirements.

SUMMARY

The present disclosure provides a gas-shielded flux cored welding electrode comprising a ferrous metal sheath and a core within the sheath. The core and sheath together comprise, in weight percentages based on the total weight of the core and sheath: 0.25 to 1.50 manganese; 0.02 to 0.12 carbon; 0.003 to 0.02 boron; 0.2 to 1.5 silicon; 0 to 0.3 molybdenum; at least one of titanium, magnesium, and aluminum, wherein the total content of titanium, magnesium, and aluminum is 0.2 to 2.5; 3 to 12 titanium dioxide; at least one arc stabilizer, where the total content of arc stabilizers is 0.05 to 1.0; no greater than 10 of additional flux system components; remainder iron and incidental impurities. The welding electrode includes significantly less manganese than certain conventional commercially available gas-shielded flux cored welding electrodes, yet may be formulated to provide tensile and other properties similar to conventional electrodes including substantially higher manganese content.

The reader will appreciate the foregoing details and advantages of the present invention, as well as others, upon considering the following detailed description of certain non-limiting embodiments of the invention. The reader also may comprehend such additional details and advantages of the present invention upon making and/or using embodiments within the present invention.

BRIEF DESCRIPTION OF THE DRAWINGS

By way of example, specific embodiments of the disclosed device will now be described, with reference to the accompanying drawings, in which.

DETAILED DESCRIPTION

Figure 1:
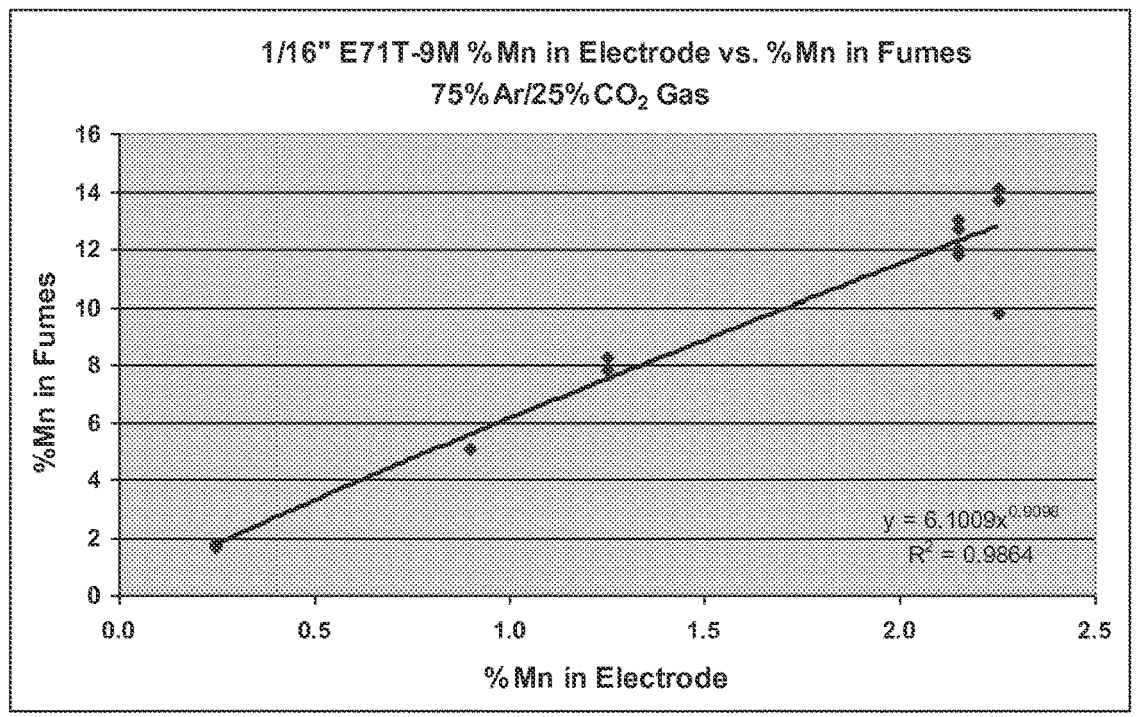
FIG. 1 is a graph plotting the weight percentage manganese in welding fumes as a function of manganese concentration in a 1/16-inch diameter E71T-9M flux cored welding electrode during gas-shielded arc welding using a 75% Ar/25% $CO_2$ shielding gas.

Various welding electrode embodiments are described in this specification to provide an overall understanding of the invention. It is understood that the various embodiments described in this specification are non-limiting and non-exhaustive. Thus, the invention is not limited by the description of the various non-limiting and non-exhaustive embodiments disclosed in this specification. In appropriate circumstances, the features and characteristics described in connection with various embodiments may be combined with the features and characteristics of other embodiments. Such modifications and variations are intended to be included within the scope of this specification. As such, the claims may be amended to recite any steps, elements, limitations, features, and/or characteristics expressly or inherently described in, or otherwise expressly or inherently supported by, this specification. Further, Applicants reserve the right to amend the claims to affirmatively disclaim steps, elements, limitations, features, and/or characteristics that are present in the prior art regardless of whether such features are explicitly described herein. Therefore, any such amendments comply with the requirements of 35 U.S.C. § 112, first paragraph, and 35 U.S.C. § 132(a). The various embodiments disclosed and described in this specification can comprise, consist of, and/or consist essentially of the elements, limitations, features, and/or characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", if and as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Various embodiments described herein are directed to gas-shielded flux cored welding electrodes including titanium dioxide based slag systems and relatively low manganese content. The relatively low manganese content in embodiments of flux cored welding electrodes described herein produce welding fumes including levels of manganese that are less than certain conventional gas-shielded flux cored welding electrodes. The manganese content in certain non-limiting embodiments of gas-shielded flux cored welding electrodes according to the present disclosure meets certain Metal Fabrication Hazardous Air Pollutants (MF-HAP) requirements under U.S. Environmental Protection Agency regulations at 40 CFR Part 63 Subpart XXXXXX pertaining to alloying element content. In particular, EPA Subpart XXXXXX requires the electrode alloy content, based on total electrode weight, to be no greater than 1.0 weight percent manganese, 0.1 weight percent nickel, 0.1 weight percent chromium, 0.1 weight percent cadmium, and 0.1 weight percent lead.

Figure 2:
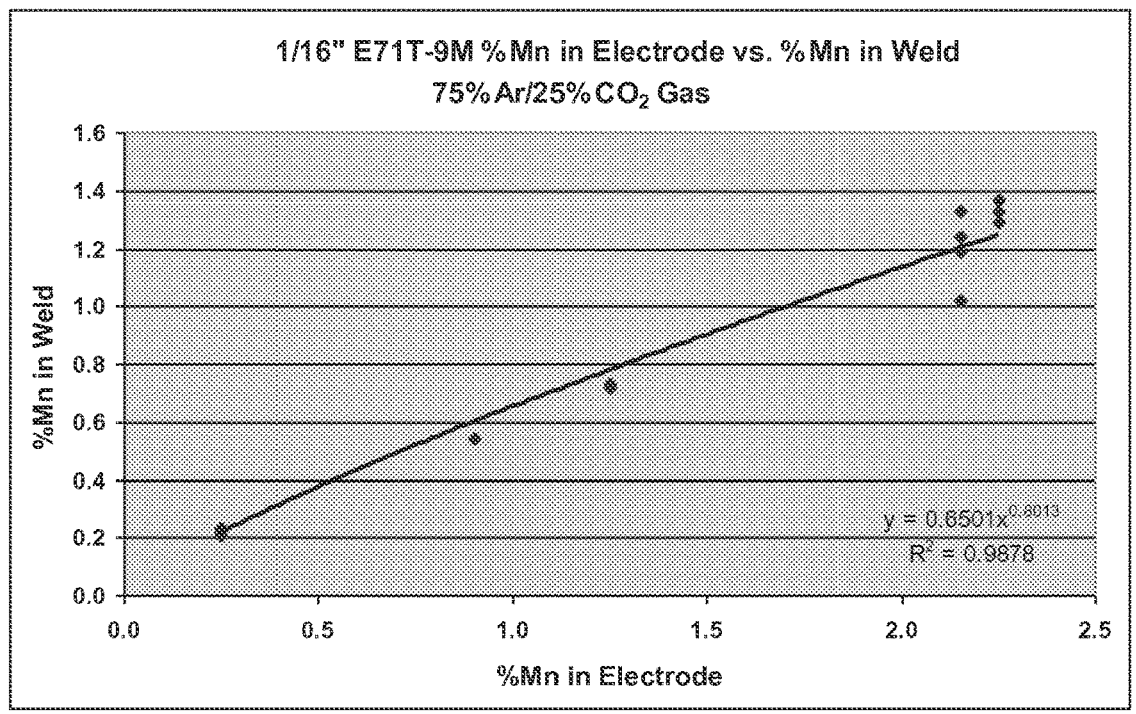
FIG. 2 is a graph plotting the weight percentage manganese in weld deposits as a function of welding electrode manganese concentration when the deposits were formed using a 1/16-inch diameter E71T-9M flux cored welding electrode and gas-shielded arc welding using a 75% Ar/25% $CO_2$ shielding gas.
Figure 3:
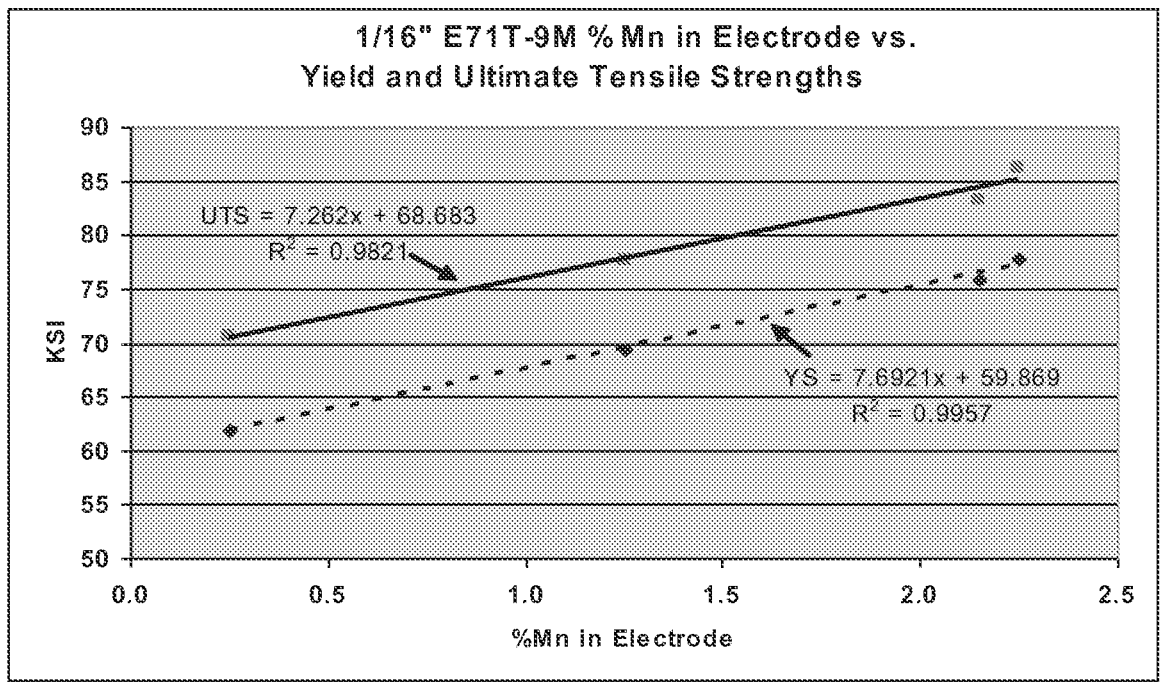
FIG. 3 is a graph plotting yield strength (YS) and ultimate tensile strength (UTS) of weld deposits as a function of welding electrode manganese concentration when the deposits were formed using a 1/16-inch diameter E71T-9M flux cored welding electrode and gas-shielded arc welding using a 75% Ar/25% $CO_2$ shielding gas.
Figure 4:
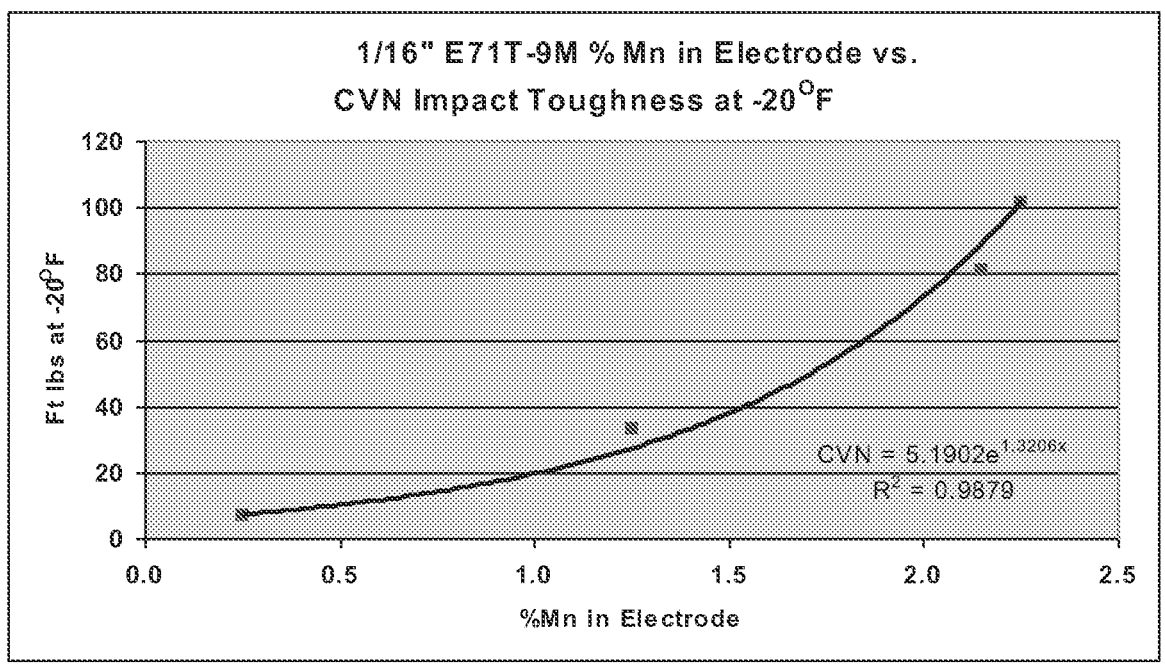
FIG. 4 is a graph plotting Charpy v-notch (CVN) impact toughness (evaluated at −20° F.) of weld deposits as a function of welding electrode manganese content when the deposits were formed using a 1/16-inch diameter E71T-9M flux cored welding electrode and gas-shielded arc welding using a 75% Ar/25% $CO_2$ shielding gas.

Although it is known that manganese enhances certain weld metal properties, it is also considered a hazardous component of the welding fumes emitted from arc welding processes if inhaled above the levels established by certain health and safety organizations. Reducing manganese content in conventional gas-shielded flux cored electrodes can reduce the manganese level in the welding fumes. For example, FIG. 1 shows the weight percentage manganese in welding fumes as a function of electrode manganese content in a $\frac{1}{16}$-inch diameter E71T-9M flux cored welding electrode during gas-shielded arc welding using a 75% Ar/25% $CO_2$ shielding gas. However, reducing manganese content in a flux cored welding electrode also can reduce manganese content in the weld metal and, in turn, weld metal toughness, tensile, and ductility properties. FIG. 2 shows the weight percentage manganese in weld deposits as a function of welding electrode manganese content when the deposits were formed using a $\frac{1}{16}$-inch diameter E71T-9M flux cored welding electrode during gas-shielded arc welding using a 75% Ar/25% $CO_2$ shielding gas. It will be seen from FIG. 2 that weld deposit manganese content increases with increasing levels of manganese in the welding electrode. FIG. 3 shows the relationship between yield strength (YS) and ultimate tensile strength (UTS) of weld deposits as a function of welding electrode manganese content when the deposits were formed using a $\frac{1}{16}$-inch diameter E71T-9M flux cored welding electrode during gas-shielded arc welding using a 75% Ar/25% $CO_2$ shielding gas. In FIG. 3, both YS and UTS of the weld deposits decreased with a reduction in electrode manganese content. FIG. 4 shows the relationship between Charpy v-notch (CVN) impact toughness (evaluated at −20° F.) of weld deposits as a function of welding electrode manganese content when the deposits were formed using a $\frac{1}{16}$-inch diameter E71T-9M flux cored welding electrode during gas-shielded arc welding using a 75% Ar/25% $CO_2$ shielding gas. In FIG. 4, CVN impact toughness of the weld deposits decreased with decreasing electrode manganese content.

Thus, welding electrode design must address competing concerns, and reducing manganese content in flux cored welding electrodes to address welding fume manganese levels may impair weld deposit mechanical properties. Previously, there were no commercially available gas-shielded flux cored welding electrodes that met the EPA Subpart XXXXXX 1.0% manganese maximum and 0.1% nickel maximum requirements, while also satisfying weld metal toughness, tensile, and ductility properties of AWS A5.20/A5.20M classifications E7XT-1C, E7XT-1M, E7XT-9C, E7XT-9M, E7XT-12C, and E7XT-12M.

Certain non-limiting embodiments of gas-shielded flux cored welding electrodes according to the present disclosure include lower manganese levels than commercially available gas-shielded flux cored welding electrodes and thereby produce welding fumes including up to about 90% less manganese. Nevertheless, welding electrode embodiments according to the present disclosure still satisfy weld metal toughness, tensile, and ductility properties specified in AWS A5.20/A5.20M and AWS A5.36/A5.36M. Gas-shielded flux cored welding electrodes according to the present disclosure comprise a ferrous metal sheath and core ingredients enclosed with the ferrous metal sheath. The gas-shielded flux cored electrodes have the following composition, in weight percentages based on the total weight of the sheath and core ingredients: 0.25 to 1.50 manganese; 0.02 to 0.12 carbon; 0.003 to 0.02 boron; 0.2 to 1.5 silicon; 0 to 0.3 molybdenum; at least one of titanium, magnesium, and aluminum, wherein the combined content of titanium, magnesium, and aluminum is 0.2 to 2.5; remainder iron and incidental impurities. Optimizing the combination of carbon, boron, silicon, molybdenum and titanium, magnesium, and/or aluminum contents can allow for a substantial reduction in manganese content of the welding electrodes relative to commercially available gas-shielded flux cored welding electrodes, while maintaining acceptable weld metal toughness, tensile, and ductility properties. The sheath encloses a particulate mixture of fluxing and possibly other ingredients.

Unless otherwise stated herein, the concentrations provided herein for the various ingredients of flux cored welding electrodes according to the present disclosure are in weight percentages calculated based on the combined weight of the ferrous sheath and the core ingredients of the welding electrode.

The gas-shielded flux cored electrodes according to the present disclosure may be fabricated using any conventional method of manufacturing such electrodes. In one non-limiting method of manufacturing welding electrodes according to the present disclosure, a coiled ferrous sheet steel is slit into strips. The strips are passed through rollers that form the strips into channels having a generally U-shaped cross-section. In the same operation, the formed strip is filled with a measured amount of particulate core ingredients. The U-shaped strip is then passed through closing rolls, forming the strip into a tube in which the core ingredients are enclosed. The tube is then drawn, rolled, or swaged to a desired size smaller than the original diameter of the formed tube, thereby providing a final welding electrode. The final electrode may be baked to remove residual lubricants and moisture or used in the unbaked condition, depending on the reduction process employed to manufacture the electrode. Other methods for making welding electrodes according to the present disclosure will be apparent to those having ordinary skill upon consider the present description.

After fabrication, gas-shielded flux cored electrodes according to the present disclosure may be used in a flux cored arc welding (FCAW) process wherein the shielding gas is selected from, for example, argon, carbon dioxide, oxygen, other inert gases, and mixtures of two or more thereof. Any FCAW equipment and process that incorporates a suitable power source, wire (electrode) feeder, gun, and system for supplying shielding gas can be used to weld materials using the gas-shielded flux cored welding electrodes according to the present disclosure.

According to one aspect of the present disclosure, a gas-shielded flux cored welding electrode includes a ferrous sheath enclosing particulate core ingredients. The gas-shielded flux cored welding electrode comprises, in weight percentages: 0.25 to 1.50 manganese; 0.02 to 0.12 carbon; 0.003 to 0.02 boron; 0.2 to 1.5 silicon; 0 to 0.3 molybdenum; at least one of titanium, magnesium, and aluminum, wherein the total content of titanium, magnesium, and aluminum is 0.2 to 2.5; remainder iron and incidental impurities. The core ingredients include a flux system comprising, in weight percentages: 3 to 12 titanium dioxide; 0.05 to 1.0 of arc stabilizers; and less than 10% of other flux ingredients. The arc stabilizers may be, for example and without limitation, one or more compounds of sodium oxide, potassium oxide, and/or other known arc stabilizers used in flux cored welding electrodes. The other flux ingredients may be, for example and without limitation, one or more of silicon dioxide, aluminum oxide, magnesium oxide, manganese oxide, zirconium oxide, and fluoride-containing compounds.

The flux system of the gas-shielded flux cored welding electrodes according to the present disclosure is based on titanium dioxide. The $TiO_2$ content in the electrodes herein may be in the range of 3 to 12 weight percent, and in certain embodiments is in the range of 7.0 to 11.0 weight percent. The $TiO_2$ may be present in the pure rutile form, but also may be present in other forms suitable as a flux ingredient for gas-shielded flux cored welding electrodes. Non-limiting examples of other suitable forms of $TiO_2$, which are also referred to herein as "$TiO_2$," include alkali metal titanates, anatase, and leucoxene. The $TiO_2$ component of the flux system helps to provide a slag viscosity and melting point necessary to support the molten metal during welding, especially during welding in positions other than horizontal and flat positions. $TiO_2$ also helps to stabilize the arc as the molten droplets cross from the electrode tip to the weld metal during welding.

The flux system of the gas-shielded flux cored welding electrodes according to the present disclosure includes one or more compounds of sodium (Na) and/or other arc stabilizing compounds. The total weight of the one or more arc stabilizing compounds is in the range of 0.05 to 1.0 weight percent, and in certain embodiments is in the range of 0.10 to 0.60 weight percent, expressed as $Na_2O$. The arc stabilizing component of the flux system serves as an arc stabilizer and reduces spatter generation during welding. The arc stabilizing component may include one or more suitable compounds of Na, potassium (K), and lithium (Li), but also may consist of or include other suitable arc stabilizers known in the art. Examples of suitable arc stabilizers include compounds of sodium oxide and potassium oxide.

Other possible components of the flux system of the gas-shielded flux cored welding electrodes according to the present disclosure may include, for example, one or more of silicon dioxide, aluminum oxide, magnesium oxide, manganese oxide, zirconium oxide, and fluoride-containing compounds that help control the slag's viscosity and/or melting point, improve weld bead fluidity and shape, help reduce weld metal diffusible hydrogen levels, and/or improve other welding performance characteristics. The total concentration of these other components should be no more than 10 weight percent based on the total weight of the sheath and core ingredients. In one embodiment, the other components of the flux system include 0.10 to 0.80 weight percent silicon dioxide, based on the total weight of the sheath and core ingredients.

The ferrous sheath and the core ingredients of the flux cored welding electrodes according to the present disclosure include one or more alloying ingredients intended to improve characteristics of the weld metal. For example, and without limitation, the alloying ingredients may be or include one or more of manganese, carbon, boron, silicon, molybdenum, titanium, magnesium, and aluminum. These alloying elements may be present in the ferrous strip as elements alloyed into the ferrous strip material and/or may be present as a component of the core ingredients in, for example, pure metallic form and/or as part of one or more ferroalloys. In any case, the alloying ingredients are present in a form that may readily be incorporated into the weld metal as alloying elements.

Manganese may be present in the flux cored welding electrodes according to the present disclosure in a concentration of 0.25 to 1.50 weight percent. Manganese is included in the electrodes to increase weld metal toughness, tensile, and ductility properties. Manganese may also function to assist in deoxidizing the weld pool during solidification and thereby helps to inhibit weld metal porosity defects. In certain non-limiting embodiments of flux cored welding electrodes according to the present disclosure, manganese is present in the range of 0.50 to 1.25 weight percent, and in certain embodiments is present in the range of 0.50 to 1.0 weight percent. The 0.25 to 1.50 weight percent manganese range is lower than the manganese content of certain conventional commercially available gas-shielded flux cored electrodes, and the reduced manganese content of the electrodes may reduce manganese present in the welding fumes by up to about 90%. Also, welding electrode embodiments according to the present disclosure including no more than 1.0 weight percent manganese satisfy the limit under Metal Fabrication Hazardous Air Pollutants (MFHAP)

requirements under U.S. Environmental Protection Agency regulations at 40 CFR Part 63 Subpart XXXXXX.

Carbon may be present in the flux cored welding electrodes according to the present disclosure in the range of 0.02 to 0.12 weight percent, and in certain embodiments is present in the range of 0.03 to 0.10 weight percent. Carbon may improve weld metal toughness, tensile, and ductility properties and in the electrodes according to the present disclosure, serves as a partial substitute for manganese in improving those properties. Carbon also may be used to deoxidize the weld pool during solidification to help prevent weld metal porosity defects.

Boron may be present in the flux cored welding electrodes according to the present disclosure in the range of 0.003 to 0.02 weight percent, and in certain embodiments is present in the range of 0.005 to 0.015 weight percent. Boron may help to increase weld metal toughness properties and in the electrodes according to the present disclosure, serves as a partial substitute for manganese in that respect.

Silicon may be present in the flux cored welding electrodes according to the present disclosure in the range of 0.2 to 1.5 weight percent, and in certain embodiments is present in the range of 0.3 to 1.0 weight percent. Silicon may deoxidize the weld pool during solidification to help prevent weld metal porosity defects. Silicon also may affect the fluidity of the weld bead and increases the slag's viscosity and support of the weld metal during solidification.

Molybdenum may be present in the flux cored welding electrodes according to the present disclosure in a concentration up to 0.3%. Molybdenum may help to increase weld metal tensile properties. In certain welding electrode embodiments herein, molybdenum is absent.

One or more of titanium, magnesium, and aluminum may be present in the flux cored welding electrodes according to the present disclosure, including in both or either of the core and the sheath of the electrodes, in quantities that are distinct from the quantities of such materials that may be present in the flux of the electrodes. The total concentration of titanium, magnesium, and aluminum is 0.2 to 2.5 weight percent. In certain non-limiting embodiments of a welding electrode according to the present disclosure, the total content of titanium and magnesium is in the range of 0.3 to 2.0 weight percent. Certain other non-limiting embodiments include magnesium in the range of 0.4 to 1.0 weight percent. In other embodiments, magnesium is present in the range of 0.2 to 1.0 weight percent, along with titanium additions in the range of 0.2 to 1.5 weight percent. Titanium, magnesium, and/or aluminum additions may act as deoxidizers and may improve weld metal toughness, tensile, and ductility properties, and one or more of titanium, magnesium, and aluminum may be added to the electrodes according to the present disclosure as partial substitutes for manganese.

Conventional gas-shielded flux cored electrodes of the AWS A5.20 and AWS A5.36/A5.36M classifications E7XT-1C, E7XT-1M, E7XT-9C, E7XT-9M, E7XT-12C, and E7XT-12M including titanium dioxide based slag systems utilize significant concentrations of manganese and may also use small concentrations of boron to achieve acceptable weld metal toughness, tensile, and ductility properties. However, these conventional electrodes also produce welding fumes during the welding process that include significant levels of manganese. No commercially available gas-shielded flux cored welding electrodes within these AWS A5.20 and AWS A5.36/A5.36M classifications meet the Metal Fabrication Hazardous Air Pollutants (MFHAP) requirement under U.S. Environmental Protection Agency 40 CFR Part 63 Subpart XXXXXX.

As discussed above, FIG. 1 shows the relationship between electrode manganese content and the manganese content of welding fumes generated during gas-shielded arc welding using the electrodes. Welding fume tests were conducted using procedures defined in AWS F1:2:2006, "Laboratory Method for Measuring Fume Generation Rates and Total Fume Emission of Welding and Allied Processes", the entire disclosure of which is incorporated herein. The average current and voltage used were 300 A and 28V, respectively. It will be seen from FIG. 1 that the manganese content of welding fumes decreased significantly as the electrode manganese content was reduced from conventional levels of about 2.2 weight percent with all other major variables held constant. The reduction in fume manganese content was up to 90% when the electrode manganese content was reduced from the typical 2.25 weight percent level to 0.25 weight percent.

As discussed above, FIG. 2 shows the relationship between electrode manganese content and manganese content in the weld deposit during gas-shielded arc welding using the electrodes. These tests were conducted using AWS A5.20/A5.20M procedures with an average current and voltage of 315 A and 28V, respectively. The weld metal manganese levels decreased as the manganese content in the electrode decreased. With all other major variables held constant, a reduction in manganese content of the electrode would reduce weld metal manganese content, thereby impairing those useful mechanical and other properties of the weld metal enhanced by the presence of manganese.

As discussed above, FIG. 3 shows the relationship between electrode manganese content and the yield and tensile properties of weld metal deposits. These tests were conducted using AWS A5.20/A5.20M procedures with an average current and voltage of 315 A and 28V, respectively. Manganese generally increases yield and tensile properties, all other variables being held constant, and a significant reduction in both YS and UTS is seen to occur as manganese content is reduced from a conventional level of at least about 2.2 weight percent to levels less than 1.5 weight percent.

As discussed above, FIG. 4 shows the relationship between electrode manganese content and CVN toughness properties of weld metal deposits formed using the electrodes. The tests were conducted using AWS A5.20/A5.20M procedures with an average current and voltage of 315 A and 28V, respectively. Manganese generally improves weld metal toughness properties, and FIG. 4 shows that CVN toughness was significantly impaired when electrode manganese content was reduced from conventional levels, all other variables being held constant.

Figure 5:
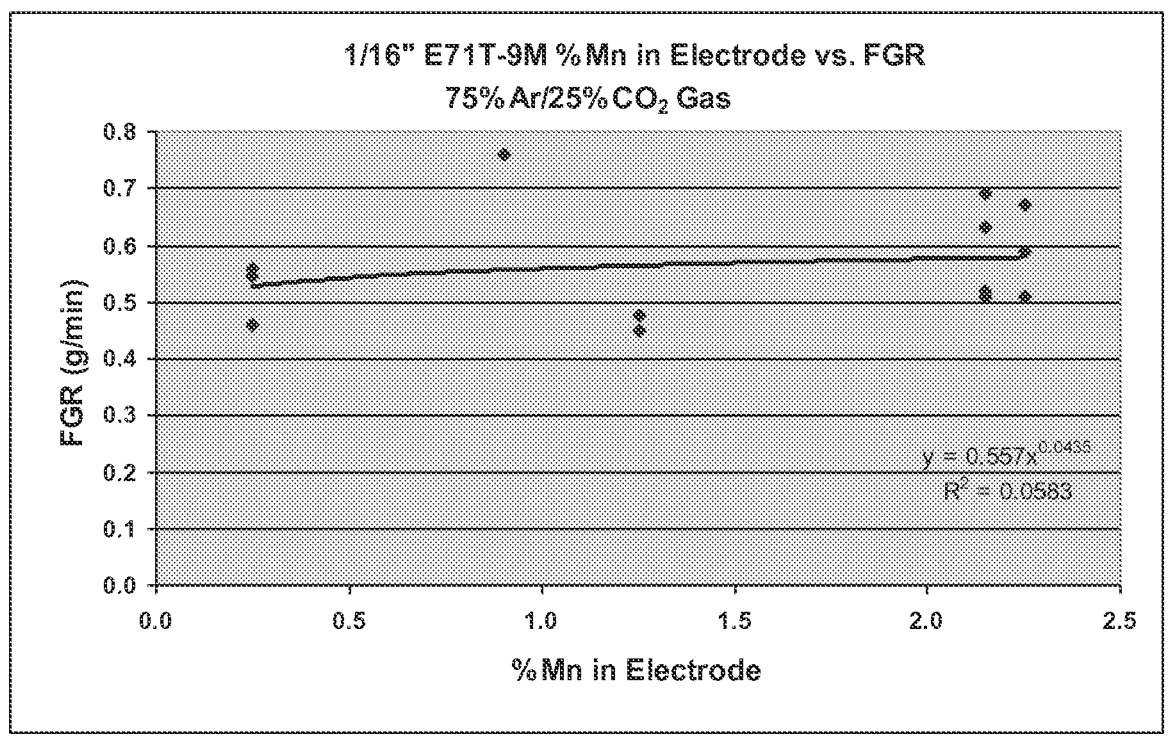
FIG. 5 is a graph plotting fume generation rate (FGR) as a function of welding electrode manganese content when the deposits were formed using a 1/16-inch diameter E71T-9M flux cored welding electrode and gas-shielded arc welding using a 75% Ar/25% $CO_2$ shielding gas.

FIG. 5 shows the relationship between fume generation rate (FGR) and the manganese content of the electrode during gas-shielded arc welding. FIG. 5 indicates no major effects on FGR as electrode manganese content is reduced from conventional levels of at least about 2.2 weight percent with all other major variables being held constant.

The following examples of low-manganese welding electrodes within the scope of the present disclosure show that the exemplary electrodes did not exhibit any significant reduction in weld metal tensile and CVN toughness properties as would be expected when significantly reducing electrode manganese content from a typical range of 2.0 to 2.5 weight percent down to the range of 0.25 to 1.50 weight percent. All test results were obtained using AWS A5.20/A5.20M procedures, with the exception that ten CVN specimens, instead of the normal five specimens, were tested and averaged to show comparisons of electrode results. In some cases, tests were repeated and the average results are shown in the figures and tables. The AWS A5.20 mechanical property requirements vary slightly with the gas-shielded flux cored electrode classifications. An E71T-9M FCAW electrode type was used to demonstrate the present invention using a 75% Ar/25% $CO_2$ shielding gas. The CVN toughness tests were conducted at −20° F., at which the minimum requirement for acceptable AWS A5.20 results is 20 ft-lbs. The required yield strength is 58 ksi minimum, and the ultimate tensile strength required range is 70 to 95 ksi.

As shown in FIGS. 3 and 4, the tensile properties (yield strength and ultimate tensile strength) and CVN impact toughness are substantially reduced when manganese is reduced in a conventional flux cored electrode. To determine the effects of carbon and boron additions for a gas-shielded flux cored welding electrode including a low manganese content of 1.25 weight percent, a conventional electrode ("STD") and three experimental electrodes were evaluated. The data are shown in Table 1.

TABLE 1

|   | STD (Avg.) | #1 (Avg.) | #2 | #3 |
|---|---|---|---|---|
| C | 0.028 | 0.036 | 0.072 | 0.072 |
| Mn | 2.15 | 1.25 | 1.25 | 1.25 |
| Si | 0.58 | 0.59 | 0.59 | 0.59 |
| B | 0.0072 | 0.0072 | 0.0072 | 0.0144 |
| Mg | 0.56 | 0.56 | 0.56 | 0.56 |
| YS (ksi) | 75.9 | 69.3 | 70.0 | 72.1 |
| UTS (ksi) | 83.2 | 77.5 | 79.9 | 81.6 |
| % EL | 28 | 30 | 31 | 28 |
| CVN @ −20° F. (Avg. ft-lbs) | 81 | 33 | 75 | 84 |

Experimental electrode #1 included increased carbon and reduced manganese relative to the conventional electrode. The test results for electrode #1 showed a 59% reduction in CVN toughness compared to the conventional electrode, which contained a manganese content in the conventional range. Increasing carbon from 0.036 weight percent in electrode #1 to 0.072 weight percent in experimental electrode #2 more than doubled CVN toughness, while retaining a low manganese content of 1.25 weight percent. In experimental electrode #3, carbon content was increased to 0.072 weight percent and boron content was increased from 0.0072 weight percent to 0.0144 weight percent. These modification further increased CVN toughness by 12% over electrode #2. The CVN toughness of low manganese electrodes #2 and #3 were substantially equivalent to the CVN toughness of the conventional electrode containing 2.15 weight percent manganese. Increasing both carbon and boron contents in electrode #3 also increased YS and UTS to levels near those of the conventional electrode.

To determine the effects of carbon at a low electrode manganese content of 0.90 weight percent, four additional experimental electrode formulations were evaluated, and the data are provided in Table 2. The CVN toughness of electrode #4, which included 0.028 weight percent carbon, did not meet the AWS A5.20 minimum of 20 ft-lbs at −20° F. Increasing carbon content to a level above 0.07 weight percent in experimental electrodes #5, #6, and #7 produced acceptable AWS A5.20 CVN toughness values, with an optimum found around 0.08 weight percent carbon. As carbon content was increased in electrodes #4 through #7, the tensile properties also trended upwardly to levels near those of the conventional electrode listed in Table 1.

TABLE 2

|   | #4 | #5 | #6 (Avg.) | #7 |
|---|---|---|---|---|
| C | 0.028 | 0.072 | 0.082 | 0.098 |
| Mn | 0.90 | 0.90 | 0.90 | 0.90 |
| Si | 0.59 | 0.59 | 0.59 | 0.59 |
| B | 0.0072 | 0.0072 | 0.0072 | 0.0072 |
| Mg | 0.56 | 0.56 | 0.56 | 0.56 |
| YS (ksi) | 67.9 | 67.1 | 68.7 | 70.8 |
| UTS (ksi) | 76.5 | 77.3 | 77.0 | 82.0 |
| % EL | 28 | 29 | 30 | 28 |
| CVN @ −20° F. (Avg. ft-lbs) | 8 | 31 | 61 | 26 |

The effects of titanium and magnesium additions were investigated using a series of experimental electrodes including a low manganese content of 0.90 weight percent and 0.08 weight percent carbon. The results are shown in Table 3. Experimental electrodes #9 and #10 included 0.24 and 0.47 weight percent titanium, respectively, and each electrode included 0.56 weight percent magnesium. The CVN toughness values of electrodes #9 and #10 were at least about equivalent to the toughness of the evaluated conventional electrode including 2.15 weight percent manganese. All listed tensile properties in Table 3 for experimental electrodes #8, #9, and #10 meet AWS A5.20 requirements, and the tensile results from electrode #10 approximated those of the conventional electrode.

TABLE 3

|   | STD (Avg.) | #8 (Avg.) | #9 | #10 (Avg.) |
|---|---|---|---|---|
| C | 0.028 | 0.082 | 0.082 | 0.082 |
| Mn | 2.15 | 0.90 | 0.90 | 0.90 |
| Si | 0.58 | 0.59 | 0.59 | 0.59 |
| B | 0.0072 | 0.0072 | 0.0072 | 0.0072 |
| Mg | 0.56 | 0.56 | 0.56 | 0.56 |
| Ti | — | — | 0.24 | 0.47 |
| Mg + Ti | 0.56 | 0.56 | 0.80 | 1.03 |
| YS (ksi) | 75.9 | 68.7 | 66.8 | 71.8 |
| UTS (ksi) | 83.2 | 77.0 | 75.6 | 80.7 |
| % EL | 28 | 30 | 27 | 29 |
| CVN @ −20° F. (Avg. ft-lbs) | 81 | 61 | 97 | 79 |

The effects of a titanium addition with magnesium also were investigated in a series of electrodes containing a very low manganese content of 0.25 weight percent and a low carbon content of 0.036 weight percent. The results are shown in Table 4. The addition of 0.78 weight percent titanium in experimental electrode #12 increased CVN toughness by approximately 70% over electrode #11. A small increase in tensile properties also was achieved with this titanium addition.

TABLE 4

|   | #11 | #12 |
|---|---|---|
| C | 0.036 | 0.036 |
| Mn | 0.25 | 0.25 |
| Si | 0.06 | 0.06 |
| B | 0.0072 | 0.0072 |
| Mg | 0.58 | 0.58 |
| Ti | 0.00 | 0.78 |
| Mg + Ti | 0.58 | 1.36 |
| YS (ksi) | 61.9 | 63.3 |

TABLE 4-continued

|  | #11 | #12 |
|---|---|---|
| UTS (ksi) | 70.7 | 73.0 |
| % EL | 28 | 28 |
| CVN @ −20° F. (Avg. ft-lbs) | 7 | 57 |

To evaluate the effects of carbon at a low manganese content of 0.90 weight percent and total titanium and magnesium content of 1.03 weight percent, experimental electrodes were evaluated as shown in Table 5. The CVN toughness increased as carbon was increased to approximately the 0.06 to 0.08 weight percent range in electrodes #13, #14, and #10, and the results were equivalent to the conventional electrode containing a high 2.15 weight percent manganese content. A corresponding increase in tensile properties also occurred as carbon was increased to approximately 0.11 weight percent in this series of experiments, and the tensile properties were similar to those of the conventional electrode evaluated. All of these tests results met the AWS A5.20 requirements.

TABLE 5

|  | STD (Avg.) | #13 | #14 | #10 (Avg.) | #15 |
|---|---|---|---|---|---|
| C | 0.028 | 0.056 | 0.066 | 0.082 | 0.106 |
| Mn | 2.15 | 0.90 | 0.90 | 0.90 | 0.90 |
| Si | 0.58 | 0.59 | 0.59 | 0.59 | 0.59 |
| B | 0.0072 | 0.0072 | 0.0072 | 0.0072 | 0.0072 |
| Mg + Ti | 0.56 | 1.03 | 1.03 | 1.03 | 1.03 |
| YS (ksi) | 75.9 | 68.4 | 66.6 | 71.8 | 72.7 |
| UTS (ksi) | 83.2 | 79.1 | 78.2 | 80.7 | 83.1 |
| % EL | 28 | 29 | 29 | 29 | 28 |
| CVN @ −20° F. (Avg. ft-lbs) | 81 | 50 | 82 | 79 | 23 |

Considering the above results from testing on experimental electrode formulations, the present inventors identified various improved low-manganese gas-shielded flux cored electrode formulations. One non-limiting embodiment a gas-shielded flux cored electrode according to the present disclosure includes a ferrous metal sheath and a core within the sheath enclosing particulate core ingredients, wherein the core ingredients and the sheath together include the following, in weight percentages based on the total weight of the sheath and the core ingredients: 0.25 to 1.50 manganese; 0.02 to 0.12 carbon; 0.003 to 0.02 boron; 0.2 to 1.5 silicon; 0 to 0.3 molybdenum; at least one of titanium, magnesium, and aluminum, wherein the total content of titanium, magnesium, and aluminum is 0.2 to 2.5; 3 to 12 titanium dioxide; at least one arc stabilizer, where the total content of arc stabilizers is 0.05 to 1.0; no greater than 10 of additional flux system components; remainder iron and incidental impurities. In certain non-limiting embodiments, the arc stabilizer includes at least one of sodium oxide and potassium oxide compounds. In certain non-limiting embodiments, the additional flux system components include one or more of silicon dioxide, aluminum oxide, magnesium oxide, manganese oxide, zirconium oxide, and fluoride-containing compounds.

An additional non-limiting embodiment of a gas-shielded flux cored electrode according to the present disclosure includes a ferrous metal sheath and a core within the sheath enclosing particulate core ingredients, wherein the core ingredients and the sheath together include the following, in weight percentages based on the total weight of the sheath and the core ingredients: 0.50 to 1.25 manganese; 0.03 to 0.10 carbon; 0.005 to 0.015 boron; 0.3 to 1.0 silicon; at least one of titanium and magnesium, wherein the total content of titanium and magnesium is 0.3 to 2.0; 7 to 11 titanium dioxide; 0.10 to 0.60 sodium oxide; 0.10 to 0.80 silicon dioxide; remainder iron and incidental impurities.

A further non-limiting embodiment of a gas-shielded flux cored welding electrode according to the present disclosure includes a ferrous metal sheath and a core within the sheath enclosing particulate core ingredients, wherein the core ingredients and the sheath together include the following, in weight percentages based on the total weight of the sheath and the core ingredients: 0.50 to 1.25 manganese; 0.03 to 0.10 carbon; 0.005 to 0.015 boron; 0.3 to 1.0 silicon; 0.4 to 1.0 magnesium; 7 to 11 titanium dioxide; 0.10 to 0.60 sodium oxide; 0.10 to 0.80 silicon dioxide; remainder iron and incidental impurities.

Yet a further non-limiting embodiment of a gas-shielded flux cored welding electrode according to the present disclosure includes a ferrous metal sheath and a core within the sheath enclosing particulate core ingredients, wherein the core ingredients and the sheath together include the following, in weight percentages based on the total weight of the sheath and the core ingredients: 0.50 to 1.25 manganese; 0.03 to 0.10 carbon; 0.005 to 0.015 boron; 0.3 to 1.0 silicon; 0.2 to 1.0 magnesium; 0.2 to 1.5 titanium; 7 to 11 titanium dioxide; 0.10 to 0.60 sodium oxide; 0.10 to 0.80 silicon dioxide; remainder iron and incidental impurities.

Yet another non-limiting embodiment of a gas-shielded flux cored welding electrode according to the present disclosure includes a ferrous metal sheath and a core within the sheath enclosing particulate core ingredients, wherein the core ingredients and the sheath together include the following, in weight percentages based on the total weight of the sheath and the core ingredients: 0.25 to 1.0 manganese; 0.03 to 0.10 carbon; 0.005 to 0.015 boron; 0.3 to 1.0 silicon; at least one of titanium and magnesium, wherein the total content of titanium and magnesium is 0.3 to 2.0; 7 to 11 titanium dioxide; 0.10 to 0.60 sodium oxide; 0.10 to 0.80 silicon dioxide; remainder iron and incidental impurities.

A further non-limiting embodiment of a gas-shielded flux cored welding electrode according to the present disclosure includes a ferrous metal sheath and a core within the sheath enclosing particulate core ingredients, wherein the core ingredients and the sheath together include the following in weight percentages, based on the total weight of the sheath and the core ingredients: 0.25 to 1.0 manganese; 0.03 to 0.10 carbon; 0.005 to 0.015 boron; 0.3 to 1.0 silicon; 0.4 to 1.0 magnesium; 7 to 11 titanium dioxide; 0.10 to 0.60 sodium oxide; 0.10 to 0.80 silicon dioxide; remainder iron and incidental impurities.

An additional embodiment of a gas-shielded flux cored welding electrode according to the present disclosure includes a ferrous metal sheath and a core within the sheath enclosing particulate core ingredients, wherein the core ingredients and the sheath together include the following in weight percentages based on the total weight of the sheath and the core ingredients: 0.25 to 1.0 manganese; 0.03 to 0.10 carbon; 0.005 to 0.015 boron; 0.3 to 1.0 silicon; 0.2 to 1.0 magnesium; 0.2 to 1.5 titanium; 7 to 11 titanium dioxide; 0.10 to 0.60 sodium oxide; 0.10 to 0.80 silicon dioxide; remainder iron and incidental impurities.

In certain embodiments, the ferrous metal sheath of the gas-shielded flux cored welding electrode according to the present disclosure is generally tubular. The gas-shielded flux cored welding electrodes according to the present disclosure may be adapted for use in flux cored arc welding wherein the shielding gas is selected from, for example, argon, carbon dioxide, oxygen, other inert gases, and mixtures of at least two thereof.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification.

The invention claimed is:

1. A gas-shielded flux cored welding electrode comprising (a) a ferrous metal sheath and (b) a core within the sheath including core ingredients, wherein the core ingredients and the sheath together comprise, in weight percentages based on the total weight of the core ingredients and the sheath:
   less than 1.0 manganese;
   up to 0.10 carbon;
   up to 0.015 boron;
   up to 1.0 silicon;
   at least one of titanium and magnesium, wherein the total content of titanium and magnesium is 0.3 to 2.0;
   7 to 11 titanium dioxide;
   at least one arc stabilizer, where the total content of arc stabilizers is 0.05 to 1.0;
   no greater than 10 of additional flux system components;
   iron; and
   incidental impurities.

2. The gas-shielded flux cored welding electrode according to claim 1, wherein the ferrous metal sheath is generally tubular.

3. The gas-shielded flux cored welding electrode according to claim 1, wherein the electrode is adapted for use in flux cored arc welding wherein the shielding gas is selected from the group consisting of argon, carbon dioxide, oxygen, other inert gases, and mixtures thereof.

4. The gas-shielded flux cored welding electrode according to claim 1, wherein the additional flux system components comprise at least one of silicon dioxide, aluminum oxide, magnesium oxide, manganese oxide, zirconium oxide, and fluoride-containing compounds.

5. The gas-shielded flux cored welding electrode according to claim 1, wherein the core ingredients and the sheath together comprise, in weight percentages based on the total weight of the core ingredients and the sheath:
   less than 1.0 manganese;
   0.03 to 0.10 carbon;
   0.005 to 0.015 boron;
   0.3 to 1.0 silicon;
   at least one of titanium and magnesium, wherein the total content of titanium and magnesium is 0.3 to 2.0;
   7 to 11 titanium dioxide;
   0.10 to 0.60 sodium oxide;
   0.10 to 0.80 silicon dioxide;
   iron; and
   incidental impurities.

6. The gas-shielded flux cored welding electrode according to claim 1, wherein the core ingredients and the sheath together comprise, in weight percentages based on the total weight of the core ingredients and the sheath:
   less than 1.0 manganese;
   0.03 to 0.10 carbon;
   0.005 to 0.015 boron;
   0.3 to 1.0 silicon;
   0.4 to 1.0 magnesium;
   7 to 11 titanium dioxide;
   0.10 to 0.60 sodium oxide;
   0.10 to 0.80 silicon dioxide;
   iron; and
   incidental impurities.

7. The gas-shielded flux cored welding electrode according to claim 1, wherein the core ingredients and the sheath together comprise, in weight percentages based on the total weight of the core ingredients and the sheath:
   less than 1.0 manganese;
   0.03 to 0.10 carbon;
   0.005 to 0.015 boron;
   0.3 to 1.0 silicon;
   0.2 to 1.0 magnesium;
   0.2 to 1.5 titanium;
   7 to 11 titanium dioxide;
   0.10 to 0.60 sodium oxide;
   0.10 to 0.80 silicon dioxide;
   iron; and
   incidental impurities.

8. The gas-shielded flux cored welding electrode according to claim 1, wherein the core ingredients and the sheath together comprise, in weight percentages based on the total weight of the core ingredients and the sheath:
   less than 1.0 manganese;
   0.03 to 0.10 carbon;
   0.005 to 0.015 boron;
   0.3 to 1.0 silicon;
   at least one of titanium and magnesium, wherein the total content of titanium and magnesium is 0.3 to 2.0;
   7 to 11 titanium dioxide;
   0.10 to 0.60 sodium oxide;
   0.10 to 0.80 silicon dioxide;
   iron; and
   incidental impurities.

9. The gas-shielded flux cored welding electrode according to claim 1, wherein the core ingredients and the sheath together comprise, in weight percentages based on the total weight of the core ingredients and the sheath:
   less than 1.0 manganese;
   0.03 to 0.10 carbon;
   0.005 to 0.015 boron;
   0.3 to 1.0 silicon;
   0.4 to 1.0 magnesium;
   7 to 11 titanium dioxide;
   0.10 to 0.60 sodium oxide;
   0.10 to 0.80 silicon dioxide;
   iron; and
   incidental impurities.

10. The gas-shielded flux cored welding electrode according to claim 1, wherein the core ingredients and the sheath together comprise, in weight percentages based on the total weight of the core ingredients and the sheath:
    less than 1.0 manganese;
    0.03 to 0.10 carbon;
    0.005 to 0.015 boron;
    0.3 to 1.0 silicon;
    0.2 to 1.0 magnesium;
    0.2 to 1.5 titanium;
    7 to 11 titanium dioxide;

0.10 to 0.60 sodium oxide;
0.10 to 0.80 silicon dioxide;
iron; and
incidental impurities.

11. The gas-shielded flux cored welding electrode according to claim 1, wherein carbon is 0.06 to 0.08.

12. The electrode according to claim 11, wherein carbon is above 0.07.

13. The electrode according to claim 1, further comprising up to 0.3 molybdenum.

14. The gas-shielded flux cored welding electrode according to claim 1, wherein when said electrode is used in accordance with AWS A5.20/A5.20M procedures with an average current and voltage of 315A and 28V, the resulting satisfies the weld metal toughness, tensile, and ductility properties specified in AWS A5.20/A5.20M and/or AWS A5.36/A5.36M.

15. The gas-shielded flux cored welding electrode according to claim 1, wherein when said electrode is used in accordance with AWS A5.20/A5.20M procedures with an average current and voltage of 315A and 28V using a 75%Ar/25%CO2 shielding gas, the resulting weld has a CVN toughness of at least 20 ft-lbs, a required yield strength of at least 58 ksi, and an ultimate tensile strength between 70 to 95 ksi, when the testing is conducted at −20° F.

* * * * *